June 17, 1952 J. A. MASON 2,600,667
AUTOMATIC STOP CONTROL FOR LOOMS
Filed March 24, 1950 6 Sheets-Sheet 1
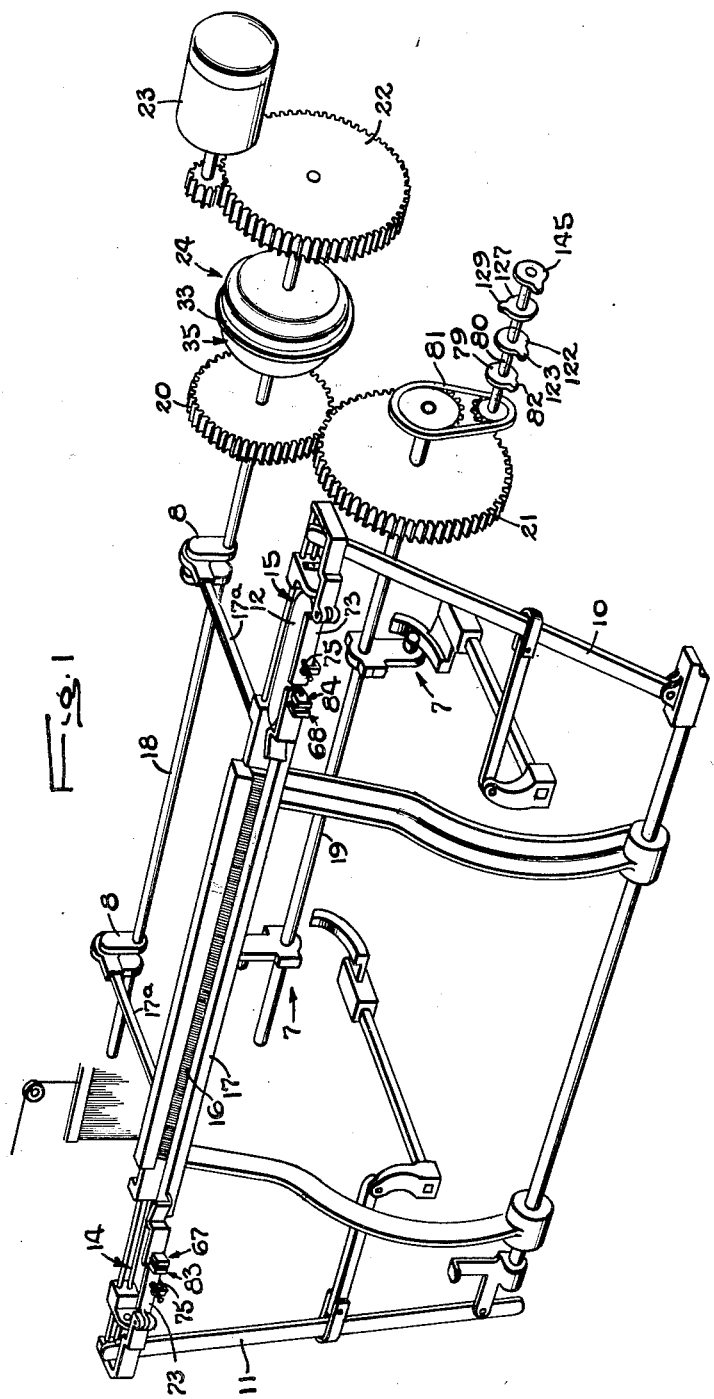
INVENTOR
James A. Mason
By Carlson, Pitzner, Hubbard & Wolfe
ATTORNEYS

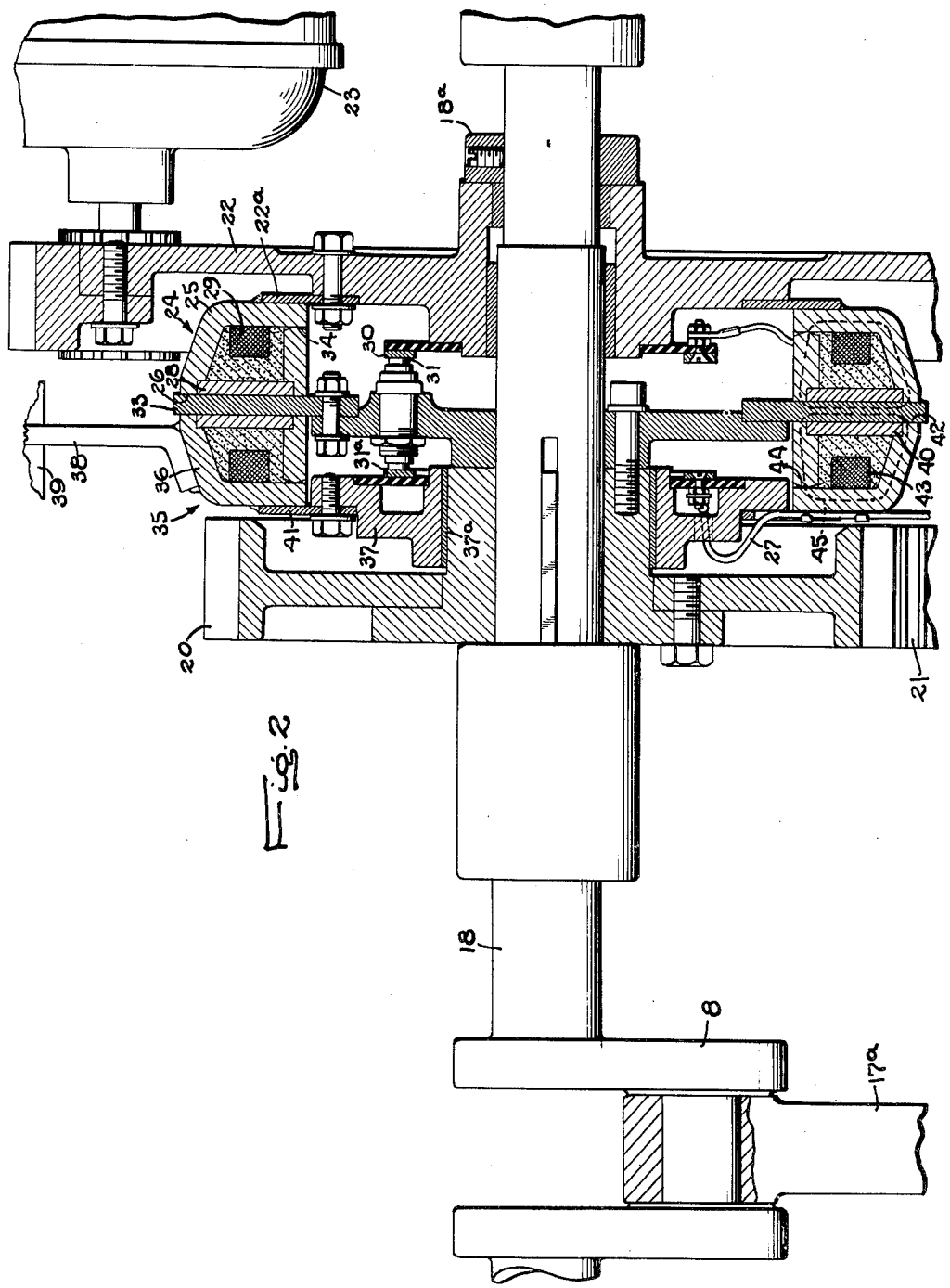

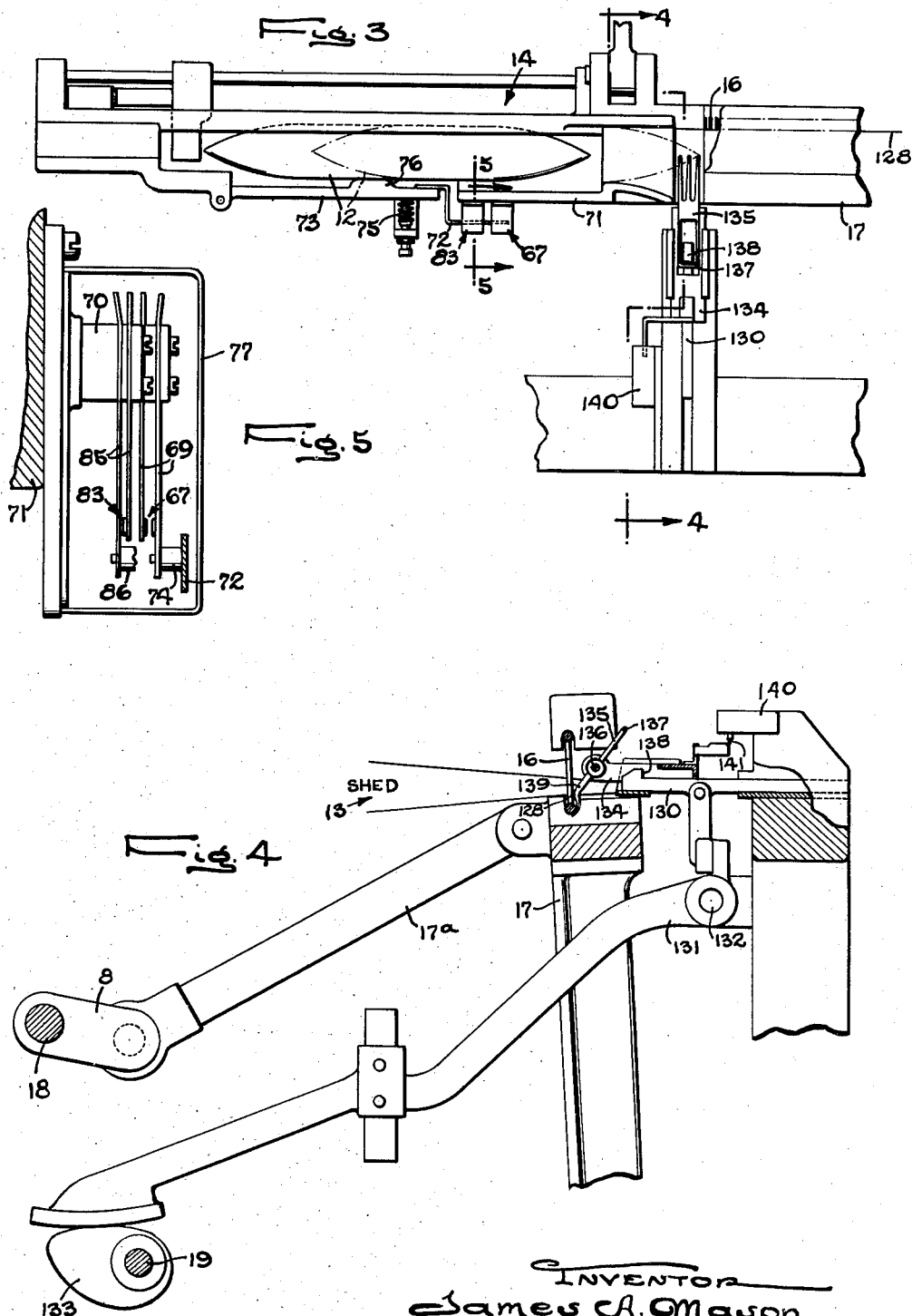

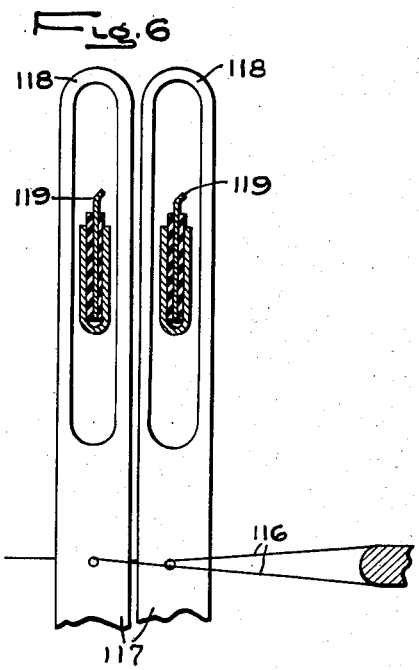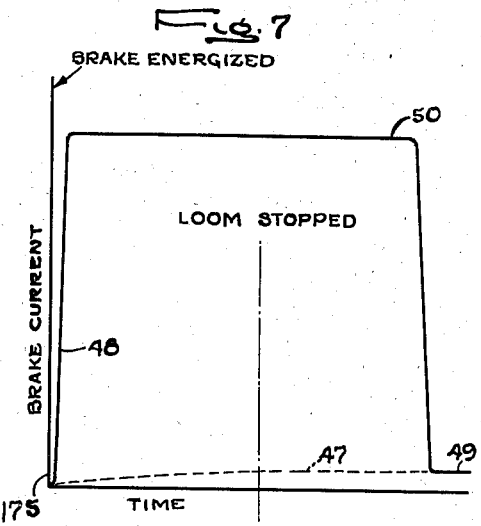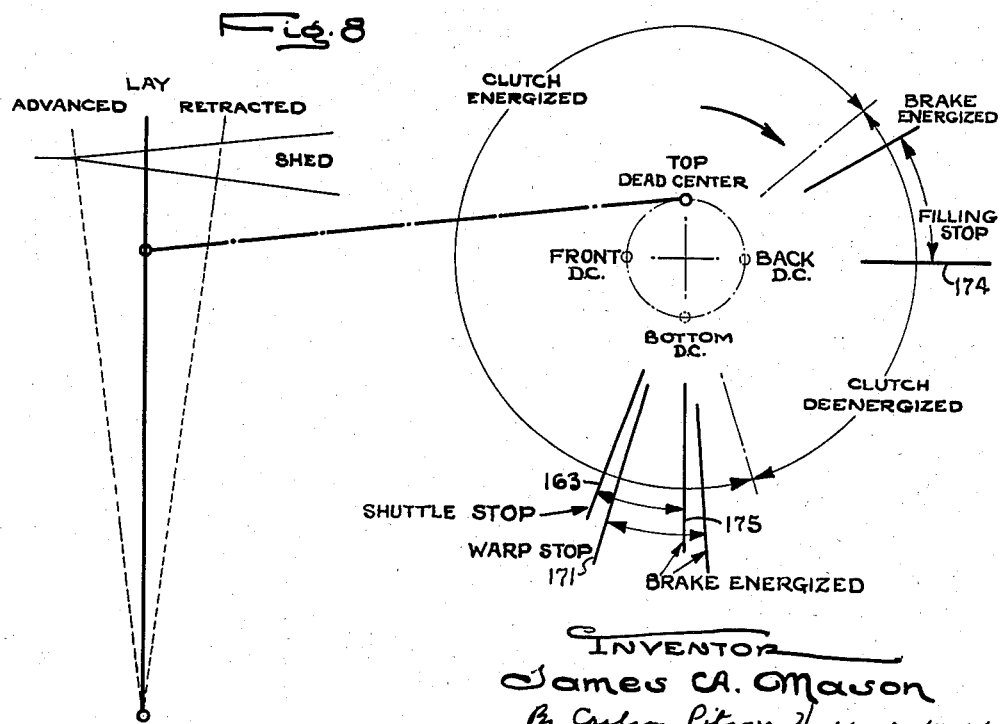

June 17, 1952   J. A. MASON   2,600,667
AUTOMATIC STOP CONTROL FOR LOOMS
Filed March 24, 1950   6 Sheets-Sheet 5
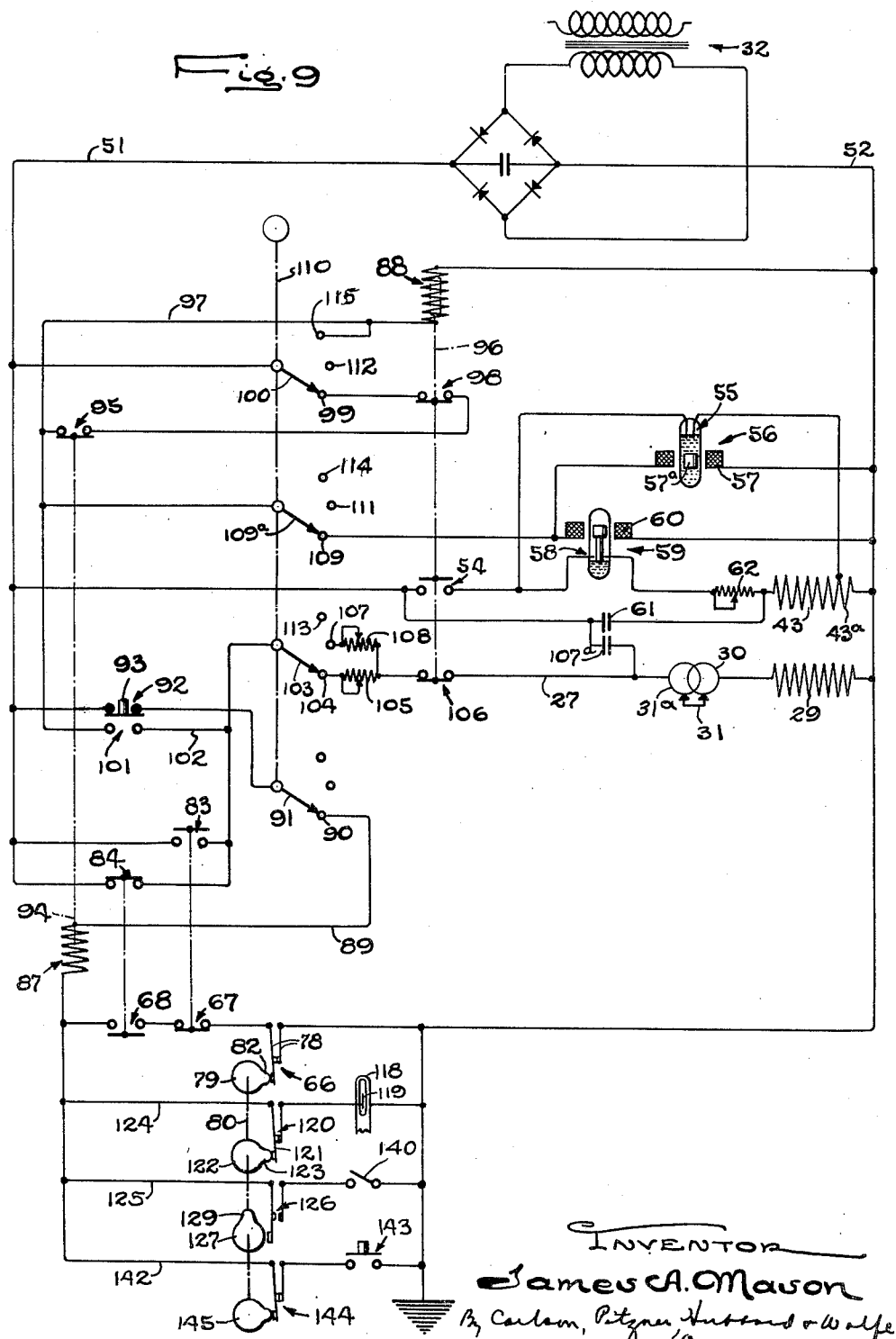

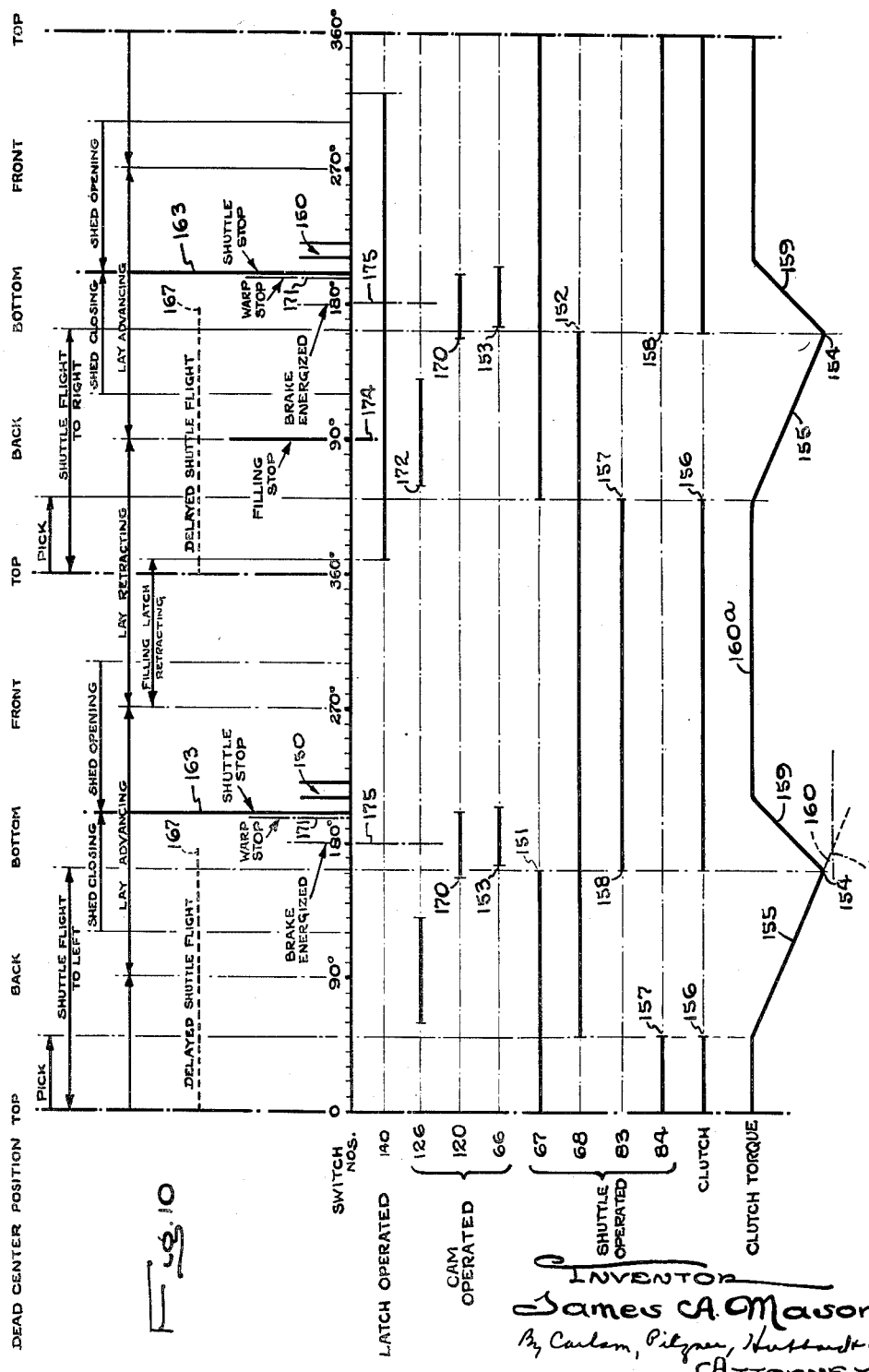

Patented June 17, 1952

2,600,667

UNITED STATES PATENT OFFICE 2,600,667

AUTOMATIC STOP CONTROL FOR LOOMS

James A. Mason, Beloit, Wis., assignor to Warner Electric Brake & Clutch Company, South Beloit, Ill., a corporation of Illinois Application March 24, 1950, Serial No. 151,565

25 Claims. (Cl. 139—341)

This invention relates to the automatic stopping of a loom by disconnecting the loom from its source of driving power and applying a brake in response to an emergency condition such as the failure of the shuttle to arrive in either shuttle box at the proper time.

The general object is to eliminate the dagger or other positively acting stops used in present day looms and to provide a novel stop mechanism of the above character which is simpler in construction, more rapid in its response, which permits better control of the shuttle deceleration, which enables the loom speed to be increased substantially, and which effects quick stopping of the loom with much less shock and strain on the parts.

A more detailed object is to drive the loom and arrest its motion by means of a direct acting clutch and brake unit of the electromagnetic friction type which interrupts the driving torque and builds up optimum retarding torque substantially instantaneously but progressively in response to an electrical signal resulting from the occurrence of an emergency such as failure of the shuttle to reach the receiving shuttle box on schedule.

Another object is to achieve quick action of the brake by temporary overenergization thereof in response to the detection of an emergency condition.

Another object is to reduce the torque transmitting capacity of the clutch in each loom cycle in anticipation of the occurrence of an emergency condition requiring stopping of the loom.

A further object is to provide a novel control for effecting the alternate increase and decrease in the current energization of the clutch in the absence of an emergency condition.

Still another object is to provide a novel mechanism for detecting failure of the shuttle to properly execute its flight through the shed.

A further object is to provide for stopping of the loom with its crankshaft in different angular positions determined selectively by which of a plurality of different emergency conditions causes the stopping.

Another object is to adapt the automatic stop mechanism for convenient manual control preparatory to starting the loom or relieving the cause of an emergency stop.

The invention also resides in the novel arrangement of the circuit control elements for the clutch and brake and for selecting the stopped position corresponding to the different emergency conditions.

Other objects and advantages of the invention will become apparent from the following detailed description taken in connection with the accompanying drawings, in which Figure 1 is a fragmentary perspective view of the main parts of a loom equipped with a stop mechanism embodying the novel features of the present invention.

Fig. 2 is a fragmentary diametrical sectional view of the clutch and brake unit and the driving parts of the loom.

Fig. 3 is a fragmentary plan view of the shuttle box and filler stop.

Figs. 4 and 5 are fragmentary sectional views taken respectively along the lines 4—4 and 5—5 of Fig. 3.

Fig. 6 is a fragmentary elevational view of the warp breakage detector switches.

Fig. 7 is a time chart showing the current variations in the brake winding.

Fig. 8 is a schematic view showing various positions of the loom crank shaft.

Fig. 9 is a schematic view and wiring diagram of the clutch and brake control circuits.

Fig. 10 is a chart illustrating the timing of the parts involved in stopping of the loom under various emergency conditions.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The invention is shown in the drawings embodied in an automatic loom of well known construction in which a pair of picker sticks 10 and 11 are operated alternately to propel a shuttle 12 back and forth through the shed 13 (Fig. 4) between two boxes 14 and 15 in which the shuttle dwells momentarily to permit beating of the last laid filler thread by the reed 16 in the next advance of the lay 17. In such looms, the pick or shuttle throwing motions, which may be adjusted to various intensities, are initiated by cams 7 on the bottom shaft 19 about the time that the cranks 8 by which the lay 17 is actuated through connecting rods 17ª are at the top dead center position as shown in Fig. 1. The adjustments are usually such that in the next half revolution of the crankshaft 18, the shuttle completes its flight through the shed and enters one of the boxes 14 and 15 shortly after the cranks 8 pass the bottom dead center positions during the forward or beat-up motion of the lay.

The crank shaft 18 makes one revolution during each loom cycle during which the camshaft 19 turns through a half revolution. These shafts are connected by gears 20 and 21 driven from an electric motor 23 or other power source. The drive extends from a pinion on the motor shaft to gear teeth on the periphery of a wheel 22 which floats axially on the crankshaft 18 and carries the driving element of a clutch 24 whose driven element is secured to the gear 20 which is keyed rigidly to the crankshaft.

To permit of quick disconnection of the loom from the power source, the clutch 24 is preferably of the direct acting electromagnetic friction type, that is to say, the parts threaded by magnetic flux to produce the gripping action are coupled directly to the drive wheel 22 and to the crankshaft 18. Accordingly, the clutch includes a magnet ring 25 (Fig. 2) of U-shaped cross-section having concentric axially projecting inner and outer pole pieces terminating in end faces 26 which are flush with each other and with the outer surface of nonmagnetic wear-resistant segments 28 seated in and rigidly backed by the pole pieces. A coil 29 comprising a multiplicity of turns of wire, 200 in the present instance, wound around the clutch axis is disposed between the magnet pole pieces and fastened securely within the ring 25. The magnet ring is coupled rigidly to the wheel 22 through a plate 22ª bolted to the inner end of the wheel and welded or otherwise fixed to the back of the magnet.

Current for energizing the coil may be supplied from a suitable low voltage source 32 (Fig. 9), a grounded line leading through the loom frame, and a slip ring 30 rotatable with the wheel and engaged by a contact 31 rotatable with the shaft 18 and bearing at its other end against an insulated nonrotatable ring 31ª connected to a conductor 27. The current may be derived from a battery, from a single phase alternating source after proper filtering as shown, or from a three phase source properly transformed and rectified to produce the equivalent unidirectional voltage of the desired magnitude, preferably about 12 volts.

The pole faces 26 of the clutch magnet are spanned by a generally flat ring 33 of magnetic material which constitutes the magnet armature and the driven element of the clutch, being in this instance bolted rigidly to the end of the hub on the gear 20. The wheel 22 floats freely on the crankshaft 18, and the coacting faces of the magnet and armature are, when the clutch is deenergized, held in close proximity by a thrust member 18ª (Fig. 2), the axial position of which may be adjusted in any suitable way.

When the magnet is energized, magnetic flux threads the closed circuit through the rings 25 and 33 and around the coil 29 as shown in dotted outline in Fig. 2 thus drawing the opposed friction faces of the rings into gripping engagement and initiating the application of driving torque to the loom. Upon interrupting the current through the coil, the attractive force and therefore the torque transmitting capacity of the clutch are reduced quickly by virtue of the rapid decay of the flux, complete disabling of the clutch being assisted by a narrow nonmagnetic gap 34 in the flux circuit.

To eliminate the difficulties resulting from the use of the dagger or other positively acting stop as in present day looms, the present invention contemplates the provision of a brake 35 by which the loom may, in the event that the shuttle does not arrive on schedule in the receiving shuttle box, be stopped without substantial shock and in a well defined position of the crankshaft 18 short of that at which damage such as breakage of the warp would be caused in the ensuing advance of the lay to beat up the last laid thread. For this purpose, the brake is of the direct acting electromagnetic friction type of the same general construction as the clutch 24 above described. To simplify the mounting of the brake and clutch parts, the armature ring 33 of the clutch may, as shown, also constitute the armature of the brake. The brake magnet comprises an iron ring 36 (Fig. 2) of U-shaped cross-section supported through a ring 37 and a bearing 37ª therein on the hub of the gear 20, the ring 37 being in this instance bolted to a plate 41 which is welded against the back of the magnet ring. To hold the magnet against turning while permitting some freedom of axial floating thereof, an arm 38 is made rigid with the ring 36 and projects loosely into a part 39 rigid with the loom frame. Suitable light spring means (not shown) urges the magnet 36 axially with sufficient force to overcome the commutator brush pressure and insure the maintenance of proper contact between the brake parts.

The pole pieces of the magnet 36 terminate in outer and inner end faces 42 which are flush with each other and with the outer face of nonmagnetic wear-resistant segments 40 seated on shoulders of the pole pieces. A coil 43 is secured rigidly between the pole pieces of the magnet ring 36 and comprises about 200 turns of No. 16 wire. To enable the magnet to be energized initially to the desired degree from a low voltage source, the winding 43 is tapped to provide a section 43ª (Fig. 9) comprising about one-tenth of the total turns and having a resistance of about .25 ohm so as to draw about 50 amperes when energized from the source 32.

By virtue of the freedom of the magnet 36 to float axially, the coacting faces of the armature 33 and the brake magnet will always be disposed in close proximity. Thus, except for a narrow gap 44 used to effect quick dissipation of residual magnetism, the flux circuit 45 through the brake magnet and its armature 33 is substantially closed at all times. As a result, the applied current is utilized most efficiently in producing the frictionally derived retarding torque which is proportional at all times to the current effectually energizing the coil 43. Moreover, since the armature 33 is fastened directly to the crankshaft and the braking torque is created by friction at the surface of the armature, the torque will become effective instantaneously to decelerate the loom.

The present invention takes advantage of the magnetic inductance inherent in a brake magnet of the above character to cause the retarding torque to develop gradually after application of the energizing current and thereby stress the parts progressively whereby to stop the loom without the usual severe shocks. In magnets of the type described, this gradual build-up of the brake torque is, however, accompanied by a corresponding delay in the attainment of a current value in the coil 43 sufficient to develop the full torque of the brake. For example, if the current initially applied to the magnet is sufficient to saturate the magnetic parts when the current attains a value 49, the effective energizing current would increase along the curve 47 (Fig. 7), and the attainment of full torque would be delayed until nearly .20 of a second after application of the current.

To overcome this and shorten the interval between the application of the energizing current and full stopping of the loom while retaining the progressive application of the retarding torque, the invention contemplates energization of the magnet initially at a current value substantially higher than normally required for producing the full torque output of the brake, and then, after a short time interval allowed for overcoming the magnet inductance, reducing the current to a safe value which will maintain the brake energized to a degree sufficient to hold the loom parts against turning. For example, if, with a magnet of the character described above, the ultimate current value of five amperes is desired, the low inductance coil section 43a may be energized initially at fifty amperes as indicated at 50 resulting in rapid building up of the effective energizing current as indicated at 48 in Fig. 7. Thus, a current value on the order of 5 amperes which would be sufficient to fully saturate the magnet core is attained instantaneously and is to be compared with an interval of nearly .2 of a second which would otherwise be required before the attainment of the full braking torque if only the 5 amperes, the current value ultimately desired, were initially applied to the magnet.

Such overenergization of the magnet may, without causing damage to the magnet, be continued for a short interval, for example .2 of a second, during which the full retarding torque of the brake continues to be applied. With the present control, the loom parts will come to rest well within this interval, usually in about .015 of a second after the initial application of the current at the higher value 50 following substantial release of the clutch 24. This corresponds to approximately 15 degrees of rotation of the crankshaft 18 in a modern loom.

Energization of the magnet to the two different degrees described above is preferably effected by first connecting the low inductance coil section 43a directly across the terminals of the voltage source 32 in response to closure of a switch 54 (Fig. 9) one terminal of which is connected directly to the power line 51. From the other switch terminal, the circuit extends to the other power line 52 through the then closed switch 55 of a delay relay 56 by which the interval of overenergization of the brake is timed. Herein, the switch 55 is closed when the winding 57 of the relay is energized as is the case during normal operation of the loom. Then, after deenergization of the winding 57, the switch is opened at the end of an interval of .2 of a second in this instance. This interval may be measured by a mercury dashpot or other well known timing device started in response to movement of the relay armature 57a following deenergization of the winding 57.

About the same time that the switch 55 is opened, a switch 58 of a second time delay relay 59 is closed to complete a parallel circuit from the switch 54 directly to the other terminal of the brake winding 43 so as to include all turns of the latter in the energizing circuit and then reduce the total current flowing through the winding to the value 49 (Fig. 7) which may be varied as desired by adjustment of a rheostat 62. The time delay relay 59, which is also energized during normal operation of the loom, is of the same general construction as the relay 56 but is adapted to close its normally open switch 58 upon deenergization of the relay winding 60 for an interval which preferably is about the same as the interval required for opening of the relay switch 55. The two relay windings 57 and 60 are connected in parallel so as to be energized and deenergized sumultaneously. Both relays are of a well known construction such that their switches are actuated immediately upon energization of their windings. The desired delay in the actuation of their switches occurs only after the windings are deenergized. Preferably, a condenser 61 is connected across the switches 54 and 58 for the purpose of minimizing arcing at the switch contacts.

Means is provided for closing the brake control switch 54 automatically at a predetermined time in the loom cycle in response to failure of the shuttle 12 to complete its flight properly and pass completely out of the shed on schedule. Such failure of the shuttle flight is detected herein by a switch 66 (Fig. 9) actuated in timed relation to the loom cycle, and acting in conjunction with switches 67 and 68 (Figs. 3, 5, 9) which are actuated in response to the movement of the shuttle in completing at least part of its flight. Preferably, the latter switches are actuated directly and mechanically by the shuttle as it actually enters the respective boxes 14 and 15 and before it reaches its final position of rest in the extreme outer end of the box but after the trailing end passes out of the shed 13 and is passing through the position shown in phantom in Fig. 3.

Herein, each of the switches 67 and 68 is formed by contacts on a pair of spring arms 69 (Fig. 5) mounted within a casing 77 on a block 70 of insulation secured against the outer face of the rigid part 71 of the shuttle box wall. An arm 72 attached to the free end of the binder 73 projects alongside of the spring arms and is connected by a pin 74 to the inner switch arm. Thus, when the shuttle is out of the box and the binder is swung inwardly under the action of its spring 75, the switch 67 is held closed. As the shuttle enters the box and its nose engages the boss 76 of the binder as shown in phantom in Fig. 3, the binder will be cammed outwardly thereby opening the switch 67 as shown in Fig. 5.

The switch 68 is similarly associated with the box 15 and actuated by the movement of the shuttle past the binder engaging position. Herein, the two switches are connected in series and normally closed and thus act jointly to indicate the presence of the shuttle in one of the boxes, this being evidenced by opening of the circuit through the switches. Simultaneous closure of both switches constitutes a signal that the shuttle is in flight or has failed to complete its flight through the shed.

The timing switch 66 is arranged in series with the switches 67 and 68 so as to coact therewith in detecting an improper shuttle flight. This switch, which may be of any preferred construction, is shown herein as comprising contacts on the ends of spring arms 78 (Fig. 9) insulated from each other and suitably mounted on the loom frame. One of the arms constitutes the follower of a cam 79 rotatable in synchronism with the loom crankshaft 18 as by mounting the cam on the crankshaft or on a separate shaft coupled thereto. For purpose of illustration, the cam is shown herein adjustably secured to a shaft 80 driven through a chain 81 from the bottom shaft 19 and at the same speed as the crankshaft. A lobe 82 on the cam engages one of the arms 78 and closes the switch for about 40 degrees of rotation of the crankshaft beginning just after the instant when the shuttle, if its flight is executed properly, enters the shuttle box and opens one of the switches 67, 68. Proper allowance is, of course, made for normal and permissible variations in the length and velocity of the shuttle flights.

With the switches 66, 67, and 68 thus arranged and actuated, the circuit therethrough will remain open continuously during proper execution of the shuttle flights. That is to say, the circuit will be held open by the timing switch 66 for the major portion of each revolution of the cam 79 and the crankshaft 18 and by one or the other of the switches 67 and 68 for the remainder of the revolution. But, if the shuttle fails to make its flight or to complete it within the proper time, both of the switches 67 and 68 will remain closed so that the circuit will be completed when the timing switch 66 is closed. Thus, closure of the circuit by the joint action of the three switches constitutes a signal that the shuttle has failed to execute its flight properly thereby necessitating stopping of the loom before the lay 17 completes its next advance.

For purposes to appear later, the shuttle actuated switches 67 and 68 are associated with reversely acting switches 83 and 84 which are formed by contacts on spring arms 85 mounted on the insulating block 70 with the inner arm joined by a pin 86 to the projection 72 on the binder 73. Each switch 83 or 84 is actuated by the shuttle so as to be closed when the shuttle enters the associated box 14 or 15 to the position shown in phantom in Fig. 3 and opens the associated switch 67 or 68 (Fig. 5). As the shuttle leaves the box and is propelled through the shed by the picker arm, the switch 83 or 84 is opened substantially simultaneously with the closing of the associated switch 67 or 68. It will be observed that the closure of either one of the switches 83 or 84 is an indication that the shuttle is disposed in one of the boxes 14 or 15 while the opening of both switches simultaneously indicates that a pick motion has been completed and that the shuttle is in flight through the shed.

To enable the energization of the brake 35 to be correlated properly with the control of the clutch 24 in the manner to be described later, the shuttle flight failure signal above referred to is, in the present instance, utilized through the medium of two relays 87 and 88. The former relay includes a winding connected to the power line 52 through the three switches 66, 67, and 68 and to line 51 through a conductor 89, a selector switch 90, 91, and a normally closed switch 92 opened by depression of a push button 93. The armature 94 of the relay 87 operates switch 95 which controls the holding circuit for the other relay 88 whose armature 96 is connected to the movable contact of the brake control switch 54. One terminal of the winding 88 of this relay is connected to the power line 52 while the other is connected to the line 51 through a conductor 97, the relay switch 95, a maintaining switch 98 which is closed whenever the relay 88 is energized, and a manually operable switch 99, 100. Thus, when the relay 88 is energized, as in normal operation of the loom, and the relay 87 becomes energized in response to a shuttle flight failure, the switch 95 will be opened and the holding circuit for the relay 88 will be broken at the switch 98 thereby allowing the switch 54 to be closed so as to cause the brake windings 43$^a$ and 43 to be energized successively in the manner described above.

Energization of the relay 88 to release the brake 35 and thus condition the loom for starting is effected manually by closure of a switch 101 which is disposed in a conductor 102 and in parallel with the switch 95. The shuttle actuated switches 83 and 84 above described are connected in parallel with each other and in series with the start switch 101 between the latter and the power line 51. If, when the switch 101 is closed manually, the shuttle is properly disposed in one of the boxes, the winding of the relay 88 will be energized through a circuit which extends through the conductor 97, the switch 101, the then closed switch 83 or 84 to the power line 51. Thereupon, the relay opens the switch 54 to deenergize the brake 35 and also closes the switch 98 to complete its own holding circuit through the then closed switch 95 of the deenergized relay 87.

Energization of the relay 88 to prepare the circuits for normal operation of the loom also causes energization of the time delay relays 58 and 59. The circuit extends through a manually operable selector switch 109, 109$^a$, the conductor 102, the then closed switch 95 of the relay 87, the switch 98, and the switch 99, 100. The relays may be disabled by swinging the selector switch arm 109$^a$ off from the contact 109.

In accordance with another aspect of the present invention, the energization of the clutch 24 is controlled in a novel manner so as to insure that when the detecting mechanism above described signals a shuttle flight failure, the torque transmitting capacity of the clutch will be reduced to a low value and the driving motor 23 substantially disconnected from the loom at the time when the brake 35 becomes effective and this, in spite of the fact that the full decay of the magnetic flux in the clutch is delayed somewhat following interruption of the current flow in the clutch winding 29. To accomplish this, advantage is taken of the fact that the clutch and motor are not heavily loaded during that portion of the loom cycle beginning with the completion of the pick motion and ending with the advance of the lay. In this interval, the desired velocity of the loom parts may be maintained with the clutch operating at only a small part of its full capacity.

Accordingly, the invention contemplates reducing the effective torque transmitting capacity of the clutch and preferably breaking the energizing circuit through the clutch winding 29 prior to the completion of the shuttle flight in anticipation of a shuttle flight failure and, then, if no such failure occurs, reenergizing the clutch in time to pick up the increasing load imposed by the lay and other parts without slippage of the clutch.

To allow ample time for decay of the clutch flux, it is preferred to interrupt the current flow in the clutch winding 29 as early as possible in the shuttle flight and more particularly at the instant that the pick motion is completed. While this condition may be detected by a cam or the like operated from another part of the loom, the motion of the shuttle out of each box 14 or 15 affords an effective indication of the completion of the pick motion irrespective of the intensity of the latter which may be adjusted to suit different operating conditions. Thus, the required signal may be obtained simply by associating the switches 83 and 84 above described with the shuttle flight detecting switches 67 and 68 for actuation in the same way. Each switch 83 or 84 is arranged to be held closed when the shuttle is disposed in the associated box and to be opened as the shuttle leaves the transmitting box.

The switches 83 and 84 are arranged in parallel with each other and in series with the clutch winding 29 whose circuit herein extends from the line 51 through one of the switches 83 or 84, the conductor 102, a manually operable switch 103, 104, an adjustable rheostat 105, a switch 106, and the conductor 27. The result is that the circuit will be broken by one of the switches 83 or 84 and the clutch deenergized whenever the shuttle is disposed outside of both of the boxes 14 and 15 or in other words, is in flight through the shed. Such interruption of the clutch energizing circuit continues in normal operation of the loom only until the shuttle flight is completed as evidenced by entry of the shuttle into the receiving box whereupon one of the switches 83 and 84 will be closed. This, unless the circuit is opened at another point, will reestablish the circuit and reenergize the clutch winding 29 to the full value thus recoupling the loom to the motor 23 for transmission of the power necessary to actuate the lay and perform the other functions in the normal way in the absence of a shuttle flight failure.

It will be observed that if the shuttle fails to complete its flight and reach the proper position within the receiving box, both of the switches 83 and 84 will remain open thus continuing the deenergization of the clutch. Such failure of the shuttle flight as well as objectionable delay in the arrival of the shuttle in the receiving box is also indicated by the joint closure of the series connected switches 66, 67, and 68 above described acting on the clutch circuit through the intermediary of the relays 87 and 88. To this end, the normally energized relay 88 includes the switch 106 which is closed when the relay winding is energized and opened upon deenergization of the relay. Thus, the clutch winding circuit is broken independently at the switches 83 and 84 simultaneously with the closure of the circuit for energizing the brake 35 and, therefore, the clutch is always disabled whenever the brake is engaged. A condenser 107a is interposed in parallel with the clutch controlling switches to minimize the danger of arcing.

The extent of energization of the clutch upon closure of the switch 106 and one of the switches 83 or 84 is controllable by the rheostat 105. By swinging the manually operable arm 103 to the contact 107, an adjustable rheostat 108 of somewhat lower resistance is substituted in the clutch circuit. This lower resistance is advantageous for use in inching the loom parts forwardly under the motor power in relatively short increments. To accomplish this, the switch arm 103 and the other arms 91, 100 and 109a fast on the same shaft 110 are swung to an intermediate position to engage intermediate contacts 107, 111, and 112. The holding circuit for the relay 88 is disabled by opening of the switch 99, 100, and the circuit for the time delay relays 56 and 59 is opened at the switch 109a and 111.

To engage the clutch 24 and inch the loom parts forwardly, the push button switch 101 is closed momentarily. This energizes the relay 88 through the conductor 102, the switch 101, and one of the then closed switches 83 or 84, thus causing the brake control switch 54 to be opened momentarily and the clutch switch 106 to be closed for a similar period which, in view of the interrupted holding circuit, is terminated upon release of the push button switch 101. With the brake released and the clutch energized momentarily, the motive power is transmitted to the loom and the parts thereof are advanced correspondingly.

Provision is also made for disabling the brake 35 under manual control while maintaining the clutch 24 disengaged thus permitting the crankshaft 18 to be turned manually for testing purposes preparatory to starting the loom under power. This is accomplished by manually turning the shaft 110 to bring the selector switch arms into engagement with contacts 113, 114, and 115. The relays 56 and 59 and the clutch circuit are thus disabled and the relay 88 is then energized through the switch 115, 100 which leads directly to the line 51. The brake is thus held released and the clutch, although the switch 106 is closed, remains released by virtue of the interruption of its circuit at the switch arm 103.

The circuits for energizing the clutch and brake magnets 25 and 36 and their connections with the windings 29 and 43 are arranged in a manner such that the inner poles 26 and 42 of the two magnets are oppositely polarized when their respective windings are energized. That is to say, the magnetic flux threading the circuits shown in phantom in Fig. 2 traverses the armature ring 33 in opposite directions radially. This results in a small leakage of the clutch flux through the magnet when the clutch is energized and the direction of this flux is the same as the main flux when the brake is energized. It has been found that this is conducive to the attainment of the full braking torque more rapidly following closure of the circuit through the winding 43.

The automatic mechanism above described may also be utilized to stop the loom in a predetermined desired position following breakage of one of the warp threads indicated at 116 (Fig. 6). Such breakage is detected in the usual way by falling of the corresponding drop wire 117 through which the thread extends and is normally supported in the position shown in Fig. 6 with its upper end 118 disposed above an insulated contact 119 which cooperates with the wire to form a detector switch. As the wire falls, the end 118 strikes the contact 119 thus giving a signal that a warp has broken.

The warp detector switch operates in conjunction with a switch 120 (Fig. 9) which is mounted on the loom frame and has a spring arm 121 operated in a predetermined relation to the loom cycle, in this instance by a cam 122 fast on the camshaft 80. The depressed dwell on the cam allows the switch to remain open for the major portion of each revolution. When the crankshaft is approaching the bottom dead center position, a lobe 123 on the cam 122 engages the arm 121 and closes the switch 120 which is held closed for about twenty degrees of the crankshaft rotation.

The switches 118, 119, and 120 are arranged in series in a circuit 124 extending through the winding of the relay 87 and in parallel with the shuttle flight detector switches 66, 67, and 68 above described. Thus, if a warp thread breaks and closes one of the switches 118, 119, the circuit for energizing the relay 87 will be completed when the loom crankshaft reaches the position determined by the cam lobe 123. Thereupon, the relay 88 will be deenergized to open the clutch switch 106 and close the brake switch 54. As a result, the loom will be stopped quickly with the shed completely closed.

In a similar way and through a similar parallel circuit 125 (Fig. 9) and a switch 126 actuated by a cam 127, the brake and clutch and their associated control circuit may be utilized to stop the loom in a desired position following failure of the filling thread 128 to carry through the shed as when a bobbin runs out or the thread thereon breaks. As before, the switch 126 comprises insulated spring arms mounted on the loom frame and one constituting the follower for the cam 127 which is fast on the shaft 80 and has a lobe 129 for closing the switch and holding the same closed while the crankshaft 18 is passing through the back dead center position.

Any suitable mechanism may be utilized to detect the failure of the thread 128 to fill the shed. Herein, the mechanism (see Figs. 3 and 4) includes a slide 130 mounted on the loom frame to slide endwise back and forth in the space between one end of the shed 13 and the end of the adjacent shuttle box 14. Reciprocation of the slide is produced by a bellcrank 131 pivoted on the frame at 132 and having an upstanding arm joined to the slide 130. The elongated rearwardly projecting arm of the bellcrank constitutes the follower of a cam 133 fast on the bottom shaft 19 and shaped to rock the bellcrank and move the slide 130 forwardly (to the right as viewed in Fig. 4) beginning during one of the pick motions.

A second slide 134 similarly mounted adjacent the slide 130 carries a feeler 135 pivoted at 136 intermediate its ends and having a hook 137 at its forward end adapted to engage behind an upstanding shoulder 138 on the slide 130. The other end 139 of the feeler is curved and hangs downwardly in the path of the filler thread 128 as it is advanced in the beat-up motion of the lay 17. If the thread properly spans the gap between the shed and the shuttle box, it will, during the advance of the lay, engage the tail 139 of the feeler and raise the hook 137 above the shoulder 138 as shown in Fig. 4. As a result, the slide 134 will not be moved by the slide 130 and a switch 140, whose actuating pin 141 is disposed in the path of the slide 134, will not be closed.

If, however, the filler thread is missing, the feeler hook 137 will continue to bear downwardly against the slide 130 and will be engaged by the shoulder 138 and then moved with the slide 130 so as to close the switch 140. Such closure of the switch continues beyond the point at which the switch 126 is closed by the cam 127 whereupon the relay 87 is energized and operates as before through the relay 88 to open the clutch switch 106 and close the brake switch 54. The loom is thus stopped quickly in a well defined position of the crankshaft 18 in which the shed is open.

If desired, a similar but separate circuit 142 (Fig. 9) may be provided for enabling the loom to be stopped in a well defined position in response to manual actuation of a control device such as a push button switch 143. This switch acts in conjunction with a timing switch 144 operated by a cam 145 on the shaft 80 having a lobe positioned according to the position in which it is desired to stop the loom crankshaft following manual closure of the switch 143.

*Operation*

The cams and other switch actuating devices above described are constructed and arranged to operate the switches substantially in the timed relation shown in Fig. 10 which also shows the timing of the peripheral parts of the loom in relation to the positions of the lay actuating cranks 8 on the crankshaft 18. The heavy lines indicate closure of the switches or the energized condition of the clutch winding.

The stop mechanism is conditioned for proper operation by first determining the range 150 (Fig. 10) of crankshaft positions within which the warp would be broken or the loom damaged in the beat-up motion of the lay 17 following a failure of the shuttle to pass out of the shed. Knowing the time (35 degrees of crankshaft rotation) required for the loom to be stopped by the brake 35 after a shuttle failure signal, the cam 79 is angularly set on the shaft 80, and the intensity of the pick motions are adjusted so that the opening of the shuttle actuated switches 67 and 68 at 151 and 152 and closure of the cam actuated switch 66 at 153 will occur about 35 degrees in advance of the danger range 150. The points 151 and 153 are spaced close together and may even overlap by an amount sufficiently small to preclude effective energization of the relay 87 by the resulting momentary circuit closure. Also, the clutch rheostat 105 is adjusted to a minimum position such that the value 154 to which the clutch torque is reduced as indicated at 155 during each cycle will be sufficient to maintain the desired velocity of the loom parts through a normal cycle, without slippage of the clutch. The brake control rheostat 62 is adjusted to produce the current value 49 desired for holding the loom parts after a stop has been made. The selector switch shaft 110 is positioned as shown in Fig. 9.

After the various adjustments have been made and the loom is properly conditioned with the shuttle in the proper box, the operation is initiated by depression of the push button 93 to close the switch 101. Through the circuits described above, this energizes the windings of the time delay relays 56 and 59 and the transfer relay 88 which is held energized by the circuit through the switches 95 and 96. With the parts thus positioned as shown in Fig. 9, the switch 54 is opened disabling the brake 35 and the switch 106 is closed so that the clutch winding 29 will be fully energized through one of the switches 83 or 84 whenever the shuttle is in either of the boxes 14 or 15.

In normal operation, the circuit through the clutch winding 29 will be interrupted at 156 in each cycle by opening the previously closed switch 83 or 84 at 157 as the pick motion is completed and the shuttle is thrown out of the transmitting box. In the ensuing decay of the flux in the magnet, the torque transmitting capacity of the clutch decreases along the line 155 and reaches a minimum value 154 at the time that the shuttle, when arriving in the receiving box on schedule, closes the switch 83 or 84 at 158 and reenergizes the winding 29. The clutch torque then increases progressively as indicated at 159 while the lay 17 is advancing, the maximum torque 160ª remaining constant for the remainder of the cycle. Thus, the torque capacity of the clutch is reduced substantially during each shuttle flight in anticipation of a shuttle flight failure but is restored automatically in due time if such failure does not occur.

If the shuttle arrives in the receiving box before the scheduled time for actuating the brake, the switch 67 or 68 will be opened by the shuttle at 151 or 152 by the time that the switch 66 is closed at 153 by the cam 79. The circuit for the relay 87 is thus held open or, if there is a slight overlapping of the closure of these switches, the circuit closure is too short to energize the relay 87 sufficiently to open the switch 95. As a result, the relay 88 remains energized and the brake is held inactive.

Assume now that the shuttle becomes caught in the shed and fails to enter the receiving box. In such a case, the shuttle actuated switches 83 and 84 will remain open and prevent normal restoration of the clutch current at 159 whereupon the torque capacity of the clutch continues to decrease as indicated at 160 and slippage of the clutch starts to occur, for example at 161. In the absence of the shuttle in both of the boxes, both of these switches 67 and 68 remain closed beyond the point 151 or 152 so that when the cam switch 66 is closed at 153, the circuit for the relay 87 is completed and the latter is energized effectually to open the switch 95. Such breaking of the holding circuit for the relay 88 deenergizes the latter thus opening the holding switch 98 and the clutch switch 106 and closing the brake control switch 54. Opening of the switch 95 also deenergizes the relays 56 and 59 to initiate timing of the delay periods above referred to.

Through the then closed relay switch 55, closure of the switch 54 substantially at the point 175 (Figs. 7 and 10) completes a circuit through the winding 43ª of the brake 35 and, by virtue of the low inductance character of the latter, the current builds up rapidly as indicated at 48 (Fig. 7) and quickly achieves a value 50 which develops the full brake torque substantially instantaneously. Because the clutch is now disabled and because the brake elements are coupled directly to the crankshaft, the parts are brought to rest at 163 in about 15 degrees of crankshaft rotation following closure of the brake winding circuit. The stop 163 is thus made well in advance of the danger zone 150 and actually ahead of the crankshaft position at which the dagger stops heretofore employed become effective.

After a short interval, usually about .2 of a second, the relay 56 will open the switch 55 and the relay 59 will close the switch 58, thus interrupting the connection to the brake winding section 43ª and substituting the entire winding 43. The current 49 thus energizing the latter is sufficient to hold the loom parts in their stopped positions in which they have come to rest before the transfer is effected by the relays 56 and 59.

Quick stopping of the loom takes place in the same way when the shuttle completes its flight but its arrival in the position shown in phantom in Fig. 4 is delayed as indicated at 167 (Fig. 10) sufficiently to cause the shuttle switches 67 and 68 to remain closed after closure of timing switch 66 for an interval of sufficient duration to cause effective energization of the relay 87 and activation of the brake as described above. In such a case, reclosure of the clutch circuit as the shuttle enters the receiving box and closes one of the switches 83, 84 is prevented by opening of the switch 106 simultaneously with the energization of the brake by deenergization of the relay 88.

After such stopping of the loom in response to failure of the shuttle to execute its flight on schedule, the cause of the stopping is remedied usually with the assistance of the inching control above described or by manually moving the loom parts after adjustment of the selector switch shaft 110 to disable the clutch and brake. Thereafter, the loom may be restarted as before simply by closing the push button switch 101 after return of the switch shaft 110 to the position shown.

In the event that a warp breaks, one of the switches 118, 119 will be closed and the relay 87 will become energized when the switch 120 is closed by the cam 122 as indicated at 170 (Fig. 10). In view of the location of this switch closure near the point 153 of closure of the shuttle cam switch 66, the clutch and brake will be operated through the action of the relays 87 and 88 to stop the loom with the crankshaft at a point 171 which is disposed close to the shuttle controlled stop 163 owing to the uniform angle required for effecting stopping of the loom after a signal is given to energize the relay 87 by which the stopping action is initiated.

In a similar way, the loom is stopped in the 35 degrees of crankshaft rotation beyond the point 172 (Fig. 10) at which the switch 126 is closed by the cam 127 following detection of the missing filler thread by closure of the switch 140 by movement of the slide 134 (Fig. 4), such closure occurring in the alternate loom cycles in the initial part of the pick motion. Such a stop indicated at 174 occurs about when the lay 17 is fully retracted.

When it is desired to stop the loom manually, the switch 143 is closed and then, upon closure of the switch 144 by the cam 145, the relay 87 will be energized and the stopping mechanism rendered active. The loom comes to rest with the crankshaft in substantially the same angular position 163 as when the stop is initiated by a failure of the shuttle flight or breakage of a warp. By adjusting the cam 145 angularly on the shaft 80, this stop position may be changed as desired to a particular loom operator or to meet other requirements.

It will be apparent from the foregoing that the improved electrically controlled stop mechanism possesses numerous advantages over the mechanisms heretofore used. Since it is possible to stop a loom a substantial distance short of the regular dagger stop, this mechanism may be omitted along with much weight which is required in order that the parts will withstand the shock of a dagger type stop. The loom parts thus lightened may be operated at higher speed resulting in greater output. With the shorter stop after a shuttle flight failure, the pick motion may be adjusted to prolong the shuttle flight and thus afford better control over the deceleration of the shuttle.

Once the mechanism has been adapted to a given loom, frequent adjustments are unnecessary as will be evident from the fact that the control switches operate independently of the pick intensity which may be adjusted as desired without influencing the stop mechanism. Moreover, the stops are made in well defined positions owing to the accuracy and reliability of the clutch and brake and their controls. The positions of the various stops may thus be selected simply by adjustment of the timing cams.

An important safety feature is that of disabling the loom drive until the shuttle is positioned properly in one of the boxes. This is achieved by extending the clutch control circuit through the manually operable switch and the shuttle actuated switches 83 and 84.

The clutch and brake construction as shown in Fig. 2 forms the subject matter of my co-pending applications Serial No. 216,420, filed March 19, 1951, and Serial No. 225,633, filed May 10, 1951.

The clutch and brake control above described and as a control of general utility forms the subject matter of my continuation-in-part application Serial No. 287,661, filed May 14, 1952.

I claim as my invention:

1. In a loom, the combination of, an electromagnetic friction brake having a winding, a nonrotatable magnetic ring and a magnetic ring rotatable with a shaft of said loom and drawn into axial gripping engagement with the first ring by magnetic flux threading through the rings upon energization of the brake winding, a similarly constructed direct acting magnetic friction clutch including a winding, a driving ring, and a second ring coupled to said loom shaft, mechanism operable during the major portion of each normal loom cycle to maintain said clutch winding energized and said brake winding deenergized, said mechanism including a device responsive to movement of the loom shuttle out of the transmitting shuttle box to vary the energization of said clutch winding and reduce the torque capacity of the clutch, a device operable as an incident to the arrival of the shuttle in the receiving shuttle box to restore the current flow in the clutch winding, means operable to detect and give a signal of the failure of the shuttle to reach said receiving shuttle box by a predetermined time in the loom cycle, mechanism coacting with said first mechanism and operable immediately in response to said signal to over-energize said brake winding to effect quick stopping of the loom, and a delay device activated in response to said signal and operable after a brief interval to reduce the energization of said brake winding to a safe value.

2. In a loom, the combination of, an electromagnetic friction clutch having a winding, a magnetic driving ring and a magnetic driven ring rotatable with a shaft of said loom and drawn into axial gripping engagement with the driving ring by magnetic flux threading through the rings upon energization of the clutch winding, a similarly constructed direct acting magnetic friction brake including a winding, a nonrotatable ring, and a second ring coupled to said loom shaft, mechanism operable during the major portion of each normal loom cycle to maintain said clutch winding energized and said brake winding deenergized, said mechanism including a device responsive to movement of the loom shuttle out of the transmitting shuttle box to interrupt the current flow through said clutch winding and a device responsive to the arrival of the shuttle in the receiving shuttle box to restore the current flow in the clutch winding, means operable to detect and give a signal of the failure of the shuttle to reach said receiving shuttle box on schedule, and mechanism coacting with said first mechanism and operable immediately in response to said signal to energize said brake winding first at a high current value during stopping of the loom and then at a reduced current value.

3. In a loom, the combination of, a shuttle movable back and forth between shuttle boxes, an electromagnetic friction clutch for driving the loom, a brake for quickly stopping the loom comprising a magnetic winding and two magnetic rings drawn into frictional gripping engagement by magnetic flux threading the rings upon energization of said winding, one of said rings being nonrotatable and the other being rotatable with a shaft of the loom, means operable to detect and give a signal of a failure of said shuttle to complete its flight at a predetermined time in each loom cycle, means operable in each loom cycle to decrease the current energization of said clutch during the flight of said shuttle and restore the energization thereof upon completion of the flight on schedule, and mechanism operable immediately in response to said signal to energize said brake winding first at a high current value and then after stopping of the loom at a lower current value.

4. In a loom, the combination of, an electromagnetic friction clutch having a winding, a magnetic driving ring and a magnetic driven ring rotatable with a shaft of said loom and drawn into axial gripping engagement with the driving ring by magnetic flux threading through the rings upon energization of the clutch winding, a similarly constructed direct acting magnetic friction brake including a winding, a nonrotatable ring, a second ring coupled to said loom shaft, mechanism operable during the major portion of each normal loom cycle to maintain said clutch winding energized and said brake winding deenergized while interrupting the current flow through said clutch winding during the flight of the shuttle between said boxes, means operable to detect and give a signal of the failure of the shuttle to reach said receiving shuttle box by a predetermined time in the loom cycle, and mechanism normally coacting with said first mechanism to restore the energization of said clutch winding in the absence of said signal and operable immediately in response to said signal to maintain the clutch winding deenergized and to energize said brake winding to effect quick stopping of the loom.

5. In a loom, the combination of, a shuttle movable back and forth between shuttle boxes, a direct acting electromagnetic friction clutch for driving the loom having a winding energized during normal operation of the loom, a normally deenergized direct acting friction brake having a winding and operable to quickly stop the loom upon energization of the brake winding, means operable to detect and give a signal of a failure of said shuttle to complete its flight at a predetermined time in each loom cycle, means operable in each loom cycle to decrease the current energization of said clutch winding during the flight of said shuttle and restore the energization thereof upon completion of the flight on schedule, and mechanism operable immediately in response to said signal to energize said brake winding while continuing the deenergization of said clutch winding.

6. In a loom having a shuttle movable back and forth between shuttle boxes, the combination of, an electromagnetic friction clutch adapted when energized to transmit rotary power to said loom, said clutch having a magnetic coil, an electromagnetic friction brake adapted when energized to stop the loom abruptly and having high and low inductance windings adapted when energized to apply the brake, means controlling the energization of said clutch coil and operable to maintain the same energized during the major portion of each loom cycle but to deenergize the coil during at least a part of the flight of said shuttle and to reenergize the same upon arrival of the shuttle in the receiving shuttle box, mechanism for detecting the failure of said shuttle to arrive in said receiving box by a scheduled time, means providing an electrical voltage source, means controlled by said detecting mechanism and operable upon failure of the shuttle to complete its flight on schedule to maintain said clutch coil deenergized and connect said low inductance winding to said voltage source, and delay action relay means controlled by said last mentioned means and operable after a brief interval to disconnect said low inductance winding from said source and connect said high inductance winding thereto.

7. In a loom having a shuttle movable back and forth between shuttle boxes, the combination of, an electromagnetic friction clutch adapted when energized to transmit rotary power to said loom, an electromagnetic friction brake adapted when energized to stop the loom abruptly and having a tapped magnetic winding comprising first and second sections of large and small numbers of turns, mechanism for detecting the failure of said shuttle to arrive in the receiving box by a scheduled time in each loom cycle, means providing an electrical voltage source, means controlled by said detecting mechanism and operable upon failure of the shuttle to complete its flight on schedule to disable said clutch and connect said second winding across said voltage source, and delay action relay means controlled by said last mentioned means and operable after a brief interval to interrupt the connection to said second winding section and connect said first winding section across said voltage source.

8. In a loom having a shuttle movable back and forth between shuttle boxes, the combination of, an electromagnetic friction clutch adapted when energized to transmit rotary power to said loom, an electromagnetic friction brake adapted when energized to stop the loom abruptly and having a tapped magnetic winding comprising first and second sections of large and small numbers of turns, mechanism for detecting the failure of said shuttle to arrive in the receiving box by a scheduled time in each loom cycle, means providing an electrical voltage source, and means controlled by said detecting mechanism and operable upon failure of the shuttle to complete its flight on schedule to disable said clutch and connect said second and first winding sections across said voltage source in succession.

9. In combination with a loom having a shuttle movable back and forth between shuttle boxes, a clutch for transmitting rotary power to said loom, an electromagnetic friction brake adapted when energized to exert a retarding force to effect quick stopping of the loom, said brake having a winding, mechanism operable in each cycle of the loom to detect the failure of said shuttle to complete its flight and arrive in the receiving shuttle box on time and to give a signal of such failure, and mechanism acting during normal cycling of said loom to maintain said clutch active and said brake winding deenergized but operable in response to said signal to disable said clutch and energize said brake winding first at a high current value and then at a reduced current.

10. In combination with a loom having a shuttle movable back and forth between shuttle boxes, a clutch for transmitting rotary power to said loom, an electromagnetic friction brake adapted when energized to exert a retarding force to effect quick stopping of the loom, said brake having a winding, mechanism operable in each cycle of the loom to detect the failure of said shuttle to complete its flight and arrive in the receiving shuttle box on time and to give an electrical signal of such failure, mechanism operable in response to said signal to disable said clutch and energize said winding at a high current value, and delay action relay means operable as an incident to energization of said winding to reduce the energizing current after momentary energization at said high value.

11. In a loom having a shuttle movable back and forth between shuttle boxes, the combination of, an electromagnetic friction clutch adapted when energized to transmit rotary power to said loom, an electromagnetic friction brake adapted when energized to stop the loom abruptly and having high and low inductance windings adapted when energized to apply the brake, means operable to maintain said clutch effectually energized during normal operation of the loom, mechanism for detecting the failure of said shuttle to arrive in said receiving box by a scheduled time, means controlled by said detecting mechanism and operable upon failure of the shuttle to complete its flight on schedule to disable said clutch and energize said low inductance winding, and delay action relay means controlled by said last mentioned means and operable after a brief interval to reduce the energization of said low inductance winding and energize said high inductance winding at a lower current value.

12. In combination with a loom having a shuttle movable back and forth between shuttle boxes, a friction clutch adapted to transmit rotary power to drive the loom, a friction brake for exerting a retarding torque to stop the loom, a winding adapted when energized and deenergized to apply and release said brake, a pair of switches connected in series, feelers associated with the respective shuttle boxes and each opened and closed respectively in response to entry and escape of the shuttle from the associated box, a third switch in series with said switches, means operated in timed relation in the loom cycle to close said third switch for an interval including the normal time of arrival of said shuttle in each of said boxes, and a circuit controlled by the joint action of said switches and operable to maintain said clutch active and said brake winding deenergized while any one of said switches is open and to disable said clutch and energize said winding upon closure of all of said switches simultaneously.

13. In combination with a loom having a friction clutch adapted to transmit rotary power to drive the loom, a friction brake for exerting a retarding torque to stop the loom, a winding adapted when energized and deenergized to apply and release said brake, a pair of switches, feelers associated with the respective shuttle boxes and each actuated reversely in response to entry and escape of the shuttle from the associated box, a third switch, means operated in timed relation in the loom cycle to actuate said third switch for an interval including the normal time of arrival of said shuttle in each of said boxes, and a circuit controlled by the joint action of said switches and operable to maintain said clutch active and said brake winding deenergized during normal operation of said shuttle to energize said winding during said interval when the shuttle fails to complete its flight before said interval.

14. In a loom, the combination of, a drive shaft, shuttle boxes, a lay, mechanism operated during rotation of said shaft to propel a shuttle back and forth between said boxes and oscillate said lay in timed relation, an electromagnetic friction brake adapted when energized to apply a retarding torque to said shaft, an electromagnetic clutch adapted when energized to transmit driving torque to said shaft, a normally open switch, means for sensing the presence of a filling thread between one of said boxes and the shed following a flight of the shuttle and operable in the absence of such thread to close said switch, a second normally open switch, means operated in timed relation to the motion of said lay and operable to maintain the second switch open when the lay is retracted and to close the switch during the initial advance of the lay, and a circuit controlled by said switches and operable to maintain said clutch energized and said brake deenergized while either of said switches is open and to deenergize said clutch and energize said brake when both of said switches are closed simultaneously.

15. In combination with a loom having a shuttle movable back and forth between shuttle boxes, a clutch for transmitting rotary power to the loom, means by which the torque transmitting capacity of said clutch may be changed, mechanism operable automatically in each cycle of the loom to reduce said torque capacity in anticipation of the failure of the shuttle to arrive in the receiving shuttle box at a scheduled time, means operable as an incident to the arrival of the shuttle in the receiving box in advance of said scheduled time to restore the normal torque capacity of the clutch, a device actuated at a predetermined point in each loom cycle corresponding to said scheduled time, and mechanism controlled jointly by said device and said last mentioned means and operable to maintain said reduced clutch capacity in the event of arrival of the shuttle in the receiving box later than said scheduled time.

16. In a loom having a shuttle thrown back and forth between the shuttle boxes of the loom, the combination of, a clutch for transmitting torque to drive said loom including an electromagnetic winding variably energizable to vary the magnitude of the driving torque, devices associated with the respective shuttle boxes and actuated by movement of the shuttle into and out of the latter, and mechanism actuated by said devices to decrease the energization of said winding as said shuttle moves out of one of said shuttle boxes and to increase the energization as the shuttle enters the receiving shuttle box.

17. In a loom having a shuttle thrown back and forth between the shuttle boxes of the loom, the combination of, a clutch for transmitting torque to drive said loom including an electromagnetic winding variably energizable to vary the magnitude of the driving torque, devices associated with the respective shuttle boxes and actuated by movement of the shuttle into and out of the latter, and mechanism actuated by said devices to decrease the energization of said winding as said shuttle moves out of one of said shuttle boxes and to increase the energization as the shuttle enters the receiving shuttle box.

18. In a loom having a shuttle, and picker arms alternately movable to throw the shuttle back and forth between the shuttle boxes of the loom, the combination of, a power driven shaft, a clutch for coupling said shaft to said loom to drive the same including an electromagnetic winding variably energizable to vary the torque transmitted by the clutch, means controlling the energization of said winding, and mechanism actuated in timed relation to the movement of said picker arms to reduce the energization of said winding as said shuttle is thrown by one of said picker arms and to increase the energization as the shuttle reaches the receiving shuttle box.

19. In combination with a loom having a shuttle movable back and forth between shuttle boxes, a clutch for transmitting rotary power to the loom, means by which the torque transmitting capacity of said clutch may be changed, mechanism operable automatically in each cycle of the loom to reduce said torque capacity in anticipation of the failure of the shuttle to arrive in the receiving shuttle box at a scheduled time, and means operable as an incident to the arrival of the shuttle in the receiving box in advance of said scheduled time to restore the normal torque capacity of the clutch.

20. In a loom having a shuttle thrown back and forth between the shuttle boxes, the combination of, a clutch for transmitting rotary power to the loom, means by which the torque transmitting capacity of said clutch may be changed, and mechanism actuated automatically in timed relation to the cycle of the loom and operable to reduce said capacity before the arrival of the shuttle in the receiving shuttle box, and independently acting means operable as an incident to the arrival of the shuttle in the receiving box to restore the normal torque capacity of the clutch.

21. In a loom having a shuttle thrown back and forth between the shuttle boxes, the combination of, a clutch for transmitting rotary power to the loom, means by which the torque transmitting capacity of said clutch may be changed, and mechanism actuated automatically in timed relation to the cycle of the loom and operable to reduce said capacity during the flight of the shuttle between said boxes and for maintaining increased torque transmitting capacity during the remainder of the loom cycle.

22. In a loom having a shuttle thrown back and forth between the shuttle boxes, the combination of, a clutch for transmitting rotary power to the loom, means by which the torque transmitting capacity of said clutch may be changed, and mechanism actuated automatically in timed relation to the cycle of the loom and operable to reduce said capacity during at least the final portion of the flight of the shuttle between said boxes, means for disabling said last mentioned mechanism and restoring full capacity of the clutch upon entry of the shuttle in the receiving shuttle box before a predetermined scheduled time.

23. In a loom, the combination of a warp breakage detector switch, a filler thread detector switch, a shuttle movable back and forth between shuttle boxes, a pair of switches each adapted to detect the failure of said shuttle to enter one of said boxes on schedule, an electromagnetic friction brake adapted when energized to stop said loom after turning of the loom crankshaft through a predetermined angle following such energization, three switches actuated in each loom cycle but at different times therein, and mechanism controlled by the joint action of said first four switches and the corresponding ones of said last mentioned switches to energize said brake at different times in said cycle whereby to stop said loom with the crankshaft in different angular positions respectively following failure of said shuttle to complete its flight, breakage of a warp, or the absence of a filler thread in the shed.

24. In a loom, the combination of, a filler thread detector switch, a shuttle movable back and forth between shuttle boxes, a switching means adapted to detect the failure of said shuttle to enter each of said boxes on schedule, an electromagnetic friction brake adapted when energized to stop said loom after turning of the loom crankshaft through a predetermined angle following such energization, cam actuated switches operated at different times in each loom cycle, mechanism controlled by the joint action of said switching means and one of said last mentioned switches to energize said brake at a predetermined time in said cycle to stop said loom with the crankshaft in one angular position following failure of said shuttle to complete its flight, and mechanism controlled by another of said cam actuated switches in the absence of a filler thread in the shed to stop said loom with said crankshaft in another angular position.

25. In a loom, the combination of, a shuttle movable back and forth between shuttle boxes, switches adapted to detect the failure of said shuttle to enter each of said boxes on schedule, an electromagnetic friction brake adapted when energized to stop said loom after turning of the loom crankshaft through a predetermined angle following such energization, a switch actuated at a predetermined time in each loom cycle, mechanism controlled by the joint action of said switches and operable to energize said brake and cause stopping of the loom with the shed thereof closed following failure of said shuttle to complete its flight, means including a fourth switch operable to detect the absence of a filler thread in said shed, and mechanism coacting with said fourth switch and operable in the absence of said filler thread to energize said brake at a time in said cycle to cause stopping of the loom with said shed open.

JAMES A. MASON.

REFERENCES CITED

The following references are of record in the file of this patent:

UNITED STATES PATENTS

| Number | Name | Date |
| --- | --- | --- |
| 905,131 | Bacon | Dec. 1, 1908 |
| 1,054,734 | Wintermayr | Mar. 4, 1913 |
| 1,080,091 | Wintermayr | Dec. 2, 1913 |
| 1,812,206 | Hindle et al. | June 30, 1931 |
| 2,146,611 | Young | Feb. 7, 1939 |
| 2,148,700 | Lohsse | Feb. 28, 1939 |
| 2,475,505 | Kronoff | July 5, 1949 |
| 2,499,887 | Sullivan et al. | Mar. 7, 1950 |